United States Patent
Jang et al.

(10) Patent No.: US 12,425,558 B2
(45) Date of Patent: Sep. 23, 2025

(54) LOW-LATENCY 360 VR STREAMING SYSTEM AND METHOD FOR ESTIMATING REGION OF INTEREST OF USER

(71) Applicant: Korea Electronics Technology Institute, Seongnam-si (KR)

(72) Inventors: Jun Hwan Jang, Goyang-si (KR); Woo Chool Park, Incheon (KR); Jin Wook Yang, Uijeongbu-si (KR); Sang Pil Yoon, Seoul (KR); Min Su Choi, Seoul (KR); Jun Suk Lee, Seoul (KR); Su Ho Song, Pyeongtaek-si (KR); Bon Jae Koo, Suwon-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 18/645,918

(22) Filed: Apr. 25, 2024

(65) Prior Publication Data
US 2024/0283901 A1 Aug. 22, 2024

Related U.S. Application Data

(63) Continuation of application No. PCT/KR2021/018752, filed on Dec. 10, 2021.

(30) Foreign Application Priority Data

Oct. 27, 2021 (KR) .................. 10-2021-0144272

(51) Int. Cl.
*H04N 13/161* (2018.01)
*G06V 10/25* (2022.01)
*H04N 13/117* (2018.01)

(52) U.S. Cl.
CPC .......... *H04N 13/161* (2018.05); *G06V 10/25* (2022.01); *H04N 13/117* (2018.05)

(58) Field of Classification Search
CPC ..... H04N 13/161; H04N 13/117; G06V 10/25
See application file for complete search history.

(56) References Cited

U.S. PATENT DOCUMENTS

| 10,523,914 B1 * | 12/2019 | Phillips ............ H04N 21/23439 |
| 2017/0302918 A1 * | 10/2017 | Mammou ............ H04N 19/103 |
| 2020/0145636 A1 * | 5/2020 | Jang ........................ H04L 65/80 |

FOREIGN PATENT DOCUMENTS

| KR | 10-2017-0095030 A | 8/2017 |
| KR | 10-2136301 B1 | 7/2020 |
| KR | 10-2021-0127593 A | 10/2021 |

OTHER PUBLICATIONS

International Search Report mailed Jul. 25, 2022 in International Application No. PCT/KR2021/018752, in 6 pages.
(Continued)

*Primary Examiner* — Mishawn N. Hunter
(74) *Attorney, Agent, or Firm* — Knobbe, Martens, Olson & Bear, LLP

(57) ABSTRACT

A low-latency 360 virtual reality (VR) streaming method for estimating a region of interest (ROI) of a user is proposed. The method may include receiving device pose information from a user device, extracting an ROI of a user, based on the device pose information, and generating ROI tile information corresponding to the ROI. The method may also include generating ROI estimation tile information corresponding to a position at which the ROI is to be changed, and requesting, from a streaming server, a tile corresponding to the ROI tile information and the ROI estimation tile information to receive a high-quality tile stream and a low-quality tile stream of full video that includes a low-quality full video tile stream. The method may further include decoding and rendering the high-quality tile stream and the low-quality full video tile stream and providing the rendered video to the user device.

11 Claims, 8 Drawing Sheets

(56) References Cited

OTHER PUBLICATIONS

Lyko et al., "Evaluation of CMAF in Live Streaming Scenarios", NOSSDAV'20, Jun. 8, 2020, Istanbul, Turkey, in 6 pages.
wowza.com, "Low-Latency CMAF for Live Streaming at Scale", Mar. 6, 2019, retrieved from the Internet Jul. 4, 2022, https://www.wowza.com/blog/low-latency-cmat-chunked-tranfer-encoding, in 4 pages.

* cited by examiner

LOW-LATENCY 360 VR STREAMING SYSTEM AND METHOD FOR ESTIMATING REGION OF INTEREST OF USER

CROSS REFERENCE TO RELATED APPLICATIONS

This is a continuation application of International Patent Application No. PCT/KR2021/018752 filed on Dec. 10, 2021, which claims priority to Korean patent application No. 10-2021-0144272 filed on Oct. 27, 2021, contents of each of which are incorporated herein by reference in their entireties.

BACKGROUND

Technical Field

The present disclosure relates to a low-latency 360 virtual reality (VR) streaming system and method for estimating a region of interest of a user.

Description of Related Technology

Recently, as 360 virtual reality (VR) industry expands, 360 VR content for services such as sport live broadcast, games, and education and head mounted display (HMD) devices for reproducing the content have variously released. 360 VR content may be categorized into realistic 360 VR content obtained through a camera rig configured with a plurality of cameras and an integrated VR camera based on a creation type and computer creation 360 VR content obtained through a three-dimensional (3D) engine such as Unreal or Unity. As obtainment equipment advances, such 360 VR content creation technology may easily create 360 VR content of 16K class or more.

SUMMARY

One aspect is a low-latency 360 virtual reality (VR) streaming system and method which may minimize a switching latency and a streaming latency and may estimate a region of interest (ROI) of a user.

Aspects of the present disclosure are not limited to those described herein.

Another aspect is a low-latency 360 virtual reality (VR) streaming method for estimating a region of interest (ROI) of a user that includes: a step of receiving device pose information from a 360 VR device (hereinafter referred to as a user device); a step of extracting an ROI of a user, based on the device pose information; a step of generating ROI tile information corresponding to the ROI; a step of generating ROI estimation tile information corresponding to a position at which the ROI is to be changed; a step of requesting, from a streaming server, a tile corresponding to the ROI tile information and the ROI estimation tile information to receive a high-quality tile stream and a low-quality tile stream of full video (hereinafter referred to as a low-quality full video tile stream); a step of decoding and rendering the high-quality tile stream and the low-quality full video tile stream; and a step of providing the rendered video to the user device.

In some embodiments of the present disclosure, the step of generating the ROI tile information may include: a step of calculating center tile information corresponding to a center of the extracted ROI; and a step of calculating tile group information corresponding to the ROI, based on the center tile information.

In some embodiments of the present disclosure, the step of calculating the tile group information corresponding to the ROI based on the center tile information may include: a step of calculating desired amount information about an adjacent tile by using size information about a tile and a resolution of the ROI; and a step of calculating a tile, corresponding to the desired amount information about the adjacent tile, as tile group information.

In some embodiments of the present disclosure, the step of generating the ROI estimation tile information may include: a step of calculating edge position information about the ROI, based on the tile group information; and a step of generating tiles adjacent to the ROI tile information as ROI estimation tile information when an amount of change in the ROI is greater than or equal to a certain distance per frame with respect to the edge position information.

In some embodiments of the present disclosure, the step of receiving the high-quality tile stream and the low-quality full video tile stream may receive the high-quality tile stream and the low-quality full video tile stream of a common media application format (CMAF) chunk unit.

In some embodiments of the present disclosure, the step of receiving the high-quality tile stream and the low-quality full video tile stream may allocate an index to each of a plurality of CMAF chunks corresponding to each tile and receives the CMAF chunks in the order of indexes of CMAF chunks alternately for each tile.

In some embodiments of the present disclosure, the step of receiving the high-quality tile stream and the low-quality full video tile stream may include: a step of receiving a low-quality full video tile stream from the streaming server; a step of receiving a high-quality tile stream (hereinafter referred to as an ROI high-quality tile stream) corresponding to the ROI tile information; and a step of receiving a high-quality tile stream (hereinafter referred to as an ROI estimation high-quality tile stream) corresponding to the ROI estimation tile information as the reception of the low-quality full video tile stream and the ROI high-quality tile stream is completed.

In some embodiments of the present disclosure, the step of decoding and rendering the high-quality tile stream and the low-quality full video tile stream may include: a step of rendering the decoded high-quality tile stream; and a step of rendering the low-quality full video tile stream in a non-rendering region as the rendering of the decoded high-quality tile stream is completed.

In some embodiments of the present disclosure, the step of decoding and rendering the high-quality tile stream and the low-quality full video tile stream may load a texture used in the rendering by using a two-circular texture buffer.

In some embodiments of the present disclosure, the step of rendering of the decoded high-quality tile stream may check a renderer buffer corresponding to the high-quality tile stream to perform mapping on a texture region corresponding to a tile, and the step of rendering the low-quality full video tile stream in the non-rendering region may scale up the low-quality full video tile stream by a size of a texture in a renderer buffer corresponding to the low-quality full video tile stream and may additionally map the low-quality full video tile stream to a texture region which is the non-rendering region.

Another aspect is a low-latency 360 virtual reality (VR) streaming system for estimating a region of interest (ROI) of a user that may include: a pose information tracking unit receiving device pose information from a 360 VR device (hereinafter referred to as a user device); a stream reception unit extracting an ROI of a user, based on the device pose information, generating ROI tile information corresponding to the ROI and ROI estimation tile information corresponding to a position at which the ROI is to be changed, and requesting, from a streaming server, a tile corresponding to the ROI tile information and the ROI estimation tile information to receive a high-quality tile stream and a low-quality tile stream of full video (hereinafter referred to as a low-quality full video tile stream); a multi-channel decoder decoding the high-quality tile stream and the low-quality full video tile stream; and a simulcast renderer performing rendering based on the decoded high-quality tile stream and the decoded low-quality full video tile stream to provide rendered video to the user device.

In addition, another method, another system, and a computer-readable recording medium recording a computer program for executing the method for implementing the present disclosure may be further provided.

According to an embodiment of the present disclosure described above, 360 VR tiled video streaming protocol based on tiled CMAF chunk may be redefined and applied, and thus, a streaming latency of video may be minimized.

Moreover, a region of interest may be estimated, tile, and defined based on device pose information and may thus be applied, and a simulcast rendering algorithm overlaying a high-quality tiled image in low-quality full video may be applied, thereby minimizing a switching latency.

The effects of the present disclosure are not limited to the above-described effects, but other effects not described herein may be clearly understood by those skilled in the art from descriptions below.

DETAILED DESCRIPTION

Figure 1:
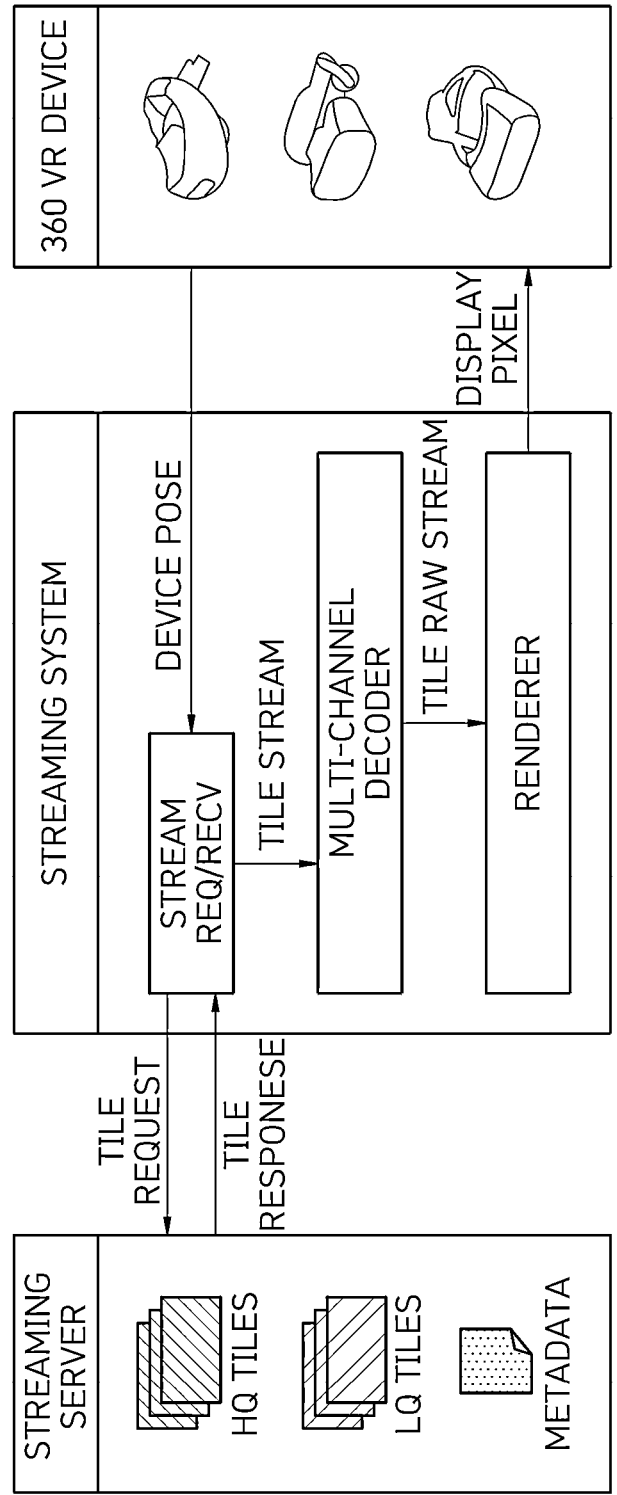
FIG. 1 is a diagram for describing a streaming system according to the related art.

In 360 VR video, because one image expresses all regions of virtual world, a screen actually seen by a user is a portion of full resolution. Therefore, an operation of streaming 360 VR video with high quality needs resolution which is far higher than that of general video. Generally, in a case where a user watches 360 VR video through an HMD device, a resolution of a region of interest (ROI) of a user actually displayed on a display needs 4K class or more so as to feel high quality, and to this end, 360 VR full resolution of 12K class or more is needed.

To stream 12K-class high-quality 360 VR video, a network bandwidth of about 400 Mbps or more is needed, and additional streaming technology for ensuring quality of service (QoS) is needed. Also, a decoding maximum resolution of high-speed hardware decoders which are recently released is impossible to decode 12K-class full video at a time, and thus, needs additional decoding technology.

As described above, because a high bandwidth and additional streaming technology should be applied for streaming high-resolution 360 VR video desired by a user, two kinds of latencies occur in a streaming process as follows. First, when an ROI of a user is changed, a switching latency occurs in a process of newly requesting an image corresponding to the ROI. Second, in a process of transmitting and reproducing video, a disconnection of the video occurs, or a streaming latency where quality is reduced occurs.

Due to such a latency, a user feels a reduction in immersion caused by the low quality of 360 VR video content and motion sickness by sense mismatch, and thus, it is difficult to popularize 360 VR service.

The advantages, features and aspects of the present disclosure will become apparent from the following description of the embodiments with reference to the accompanying drawings, which is set forth hereinafter. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Herein, like reference numeral refers to like element, and "and/or" include(s) one or more combinations and each of described elements. Although "first" and "second" are used for describing various elements, but the elements are not limited by the terms. Such terms are used for distinguishing one element from another element. Therefore, a first element described below may be a second element within the technical scope of the present disclosure.

Unless otherwise defined, all terms (including technical and scientific terms) used herein may be used as a meaning capable of being commonly understood by one of ordinary skill in the art. Also, terms defined in dictionaries used generally are not ideally or excessively construed unless clearly and specially defined.

FIG. 1 is a diagram for describing a streaming system according to the related art.

In the related art, a streaming system which has received device pose information from a 360 virtual reality (VR) device (hereinafter referred to as a user device) such as a head mounted display (HMD) device requests a tile stream, corresponding to a region of interest (ROI) of a user, from a streaming server.

Subsequently, the streaming server transmits tile streams having a certain time-block unit to the streaming system and transmits the tile stream, corresponding to the ROI of the user, as a high-quality (HQ) and low-quality (LQ) tile stream.

Subsequently, the streaming system decodes the high-quality and low-quality tile stream received thereby by using a multi-channel decoder and configures one image through a renderer to provide to a user device.

Such a conventional streaming system estimates the ROI of the user by using device pose information at a specific moment. Therefore, in a case where a position of the user device is continuously changed, the conventional streaming system should continuously request a high-quality tile stream from the streaming server, and due to this, there is a problem where an ROI switching latency occurs.

Moreover, the streaming server transmits tile streams having a certain time-block unit to the streaming system, and due to this, there is a problem where a streaming latency occurs.

Moreover, when a specific video tile stream received from the streaming server is omitted due to an arbitrary issue, there is a problem where a latency based on a time video re-request occurs.

To solve such a problem, a low-latency 360 VR streaming system for estimating an ROI of a user proposes the following method.

First, transmission/reception protocol between a streaming server and a streaming system uses 360 VR tiled video streaming protocol based on tiled common media application format (CMAF) chunk based on CMAF technology. CMAF protocol does not need to receive all video streams for decoding and may be decoded immediately after initial CMAF chunk is received. By using this, an embodiment of the present disclosure defines conventional CMAF protocol as a high-quality ROI tile, a high-quality ROI estimation tile, and a low-quality full video tile and redefines and applies 360 VR streaming protocol based on tiled CMAF chunk. Particularly, an embodiment of the present disclosure may stream only a portion corresponding to an ROI of a user as a high-quality ROI tile, and thus, may largely decrease a transmission bandwidth needed for streaming and may satisfy maximum resolution provided by a hardware decoder while supporting 16K-class full resolution 360 VR video streaming.

Moreover, by using device pose information, an embodiment of the present disclosure may apply an ROI estimation algorithm estimating an ROI to which a user will move forward, thereby minimizing a switching latency. Such an ROI estimation algorithm calculates an ROI of a user by using device pose information, extracts a tile corresponding to the ROI in full video, predicts a motion of a device, based on the device pose information, predicts the amount of change in the ROI of the user, and previously caches tiles corresponding thereto.

Moreover, an embodiment of the present disclosure is characterized by applying a streaming algorithm based on simulcast rendering. That is, a conventional method synthesizes a high-quality tile stream with a low-quality tile stream to configure one full video, but an embodiment of the present disclosure configures full video, based on a concept which overlays the high-quality tile stream in the low-quality tile stream. Based on such a method, an embodiment of the present disclosure has an advantage where a problem does not occur in configuring full video despite a situation where a specific high-quality video stream is omitted, and seamless 360 VR video streaming is capable of being supported to a user despite a situation where video transmission/reception is delayed due to network traffic.

Figure 2:
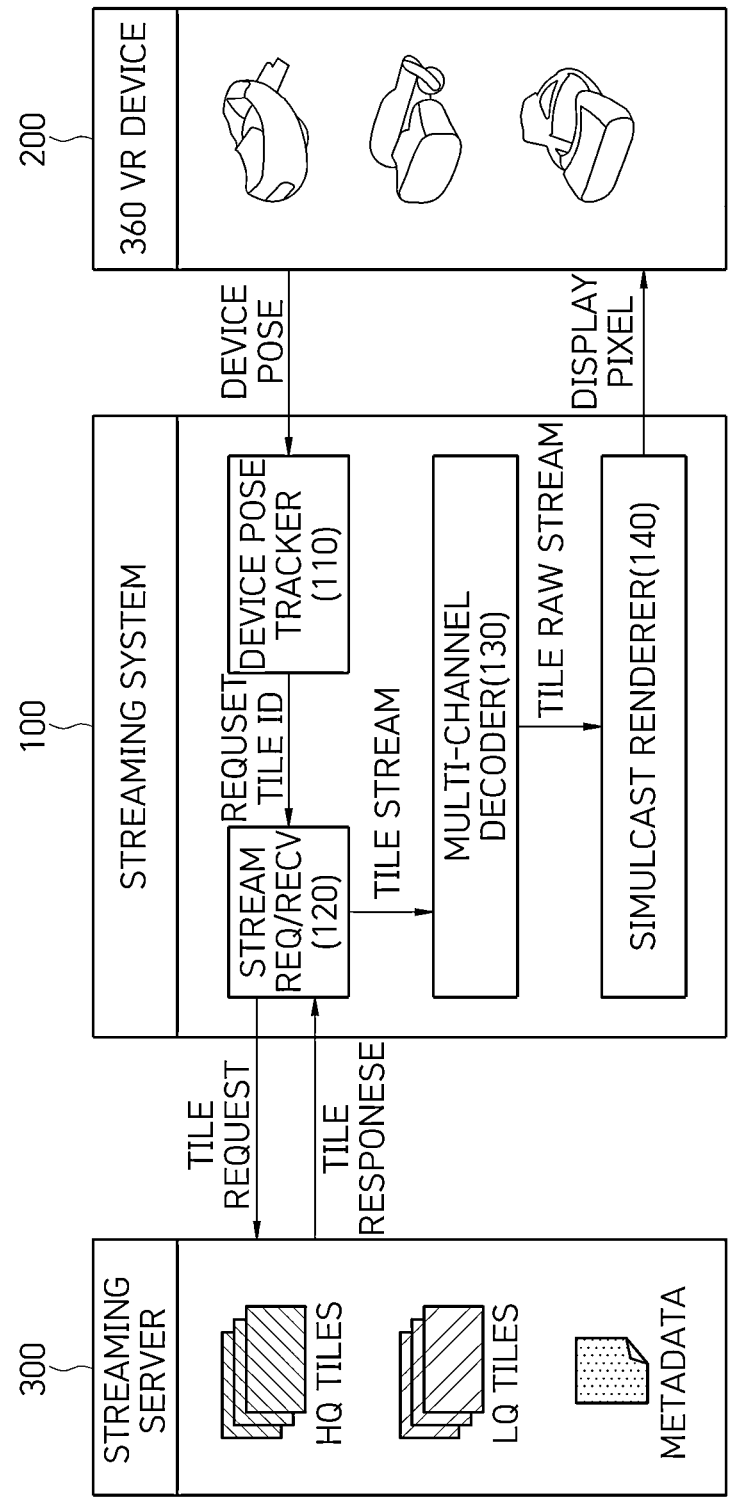
FIG. 2 is a block diagrams of a low-latency 360 VR streaming system for estimating a region of interest (ROI) of a user according to an embodiment of the present disclosure.

FIG. 2 is a block diagrams of a low-latency 360 VR streaming system 100 for estimating an ROI of a user according to an embodiment of the present disclosure.

The low-latency 360 VR streaming system 100 according to an embodiment of the present disclosure includes a pose information tracking unit (or a pose information tracking processor) 110, a stream reception unit (or a stream reception processor) 120, a multi-channel decoder 130, and a simulcast renderer (or a simulcast rendering processor) 140. The pose information tracking unit 110 receives device pose information from a user device 200.

The stream reception unit 120 extracts an ROI of a user, based on the device pose information, and generates ROI tile information corresponding to the ROI and ROI estimation tile information corresponding to a position at which the ROI is to be changed. Also, the stream reception unit 120 requests, from the streaming server 400, a tile corresponding to the ROI tile information and the ROI estimation tile information to receive a high-quality tile stream and a low-quality full video tile stream.

The multi-channel decoder 130 decodes the high-quality tile stream and the low-quality full video tile stream, and the simulcast renderer 140 performs rendering based on a decoded high-quality tile stream and a decoded low-quality full video tile stream to provide rendered video to the user device 200.

Hereinafter, a method performed by the low-latency 360 VR streaming system 100 for estimating an ROI of a user according to an embodiment of the present disclosure will be described in more detail with reference to FIGS. 3 to 9.

Figure 3:
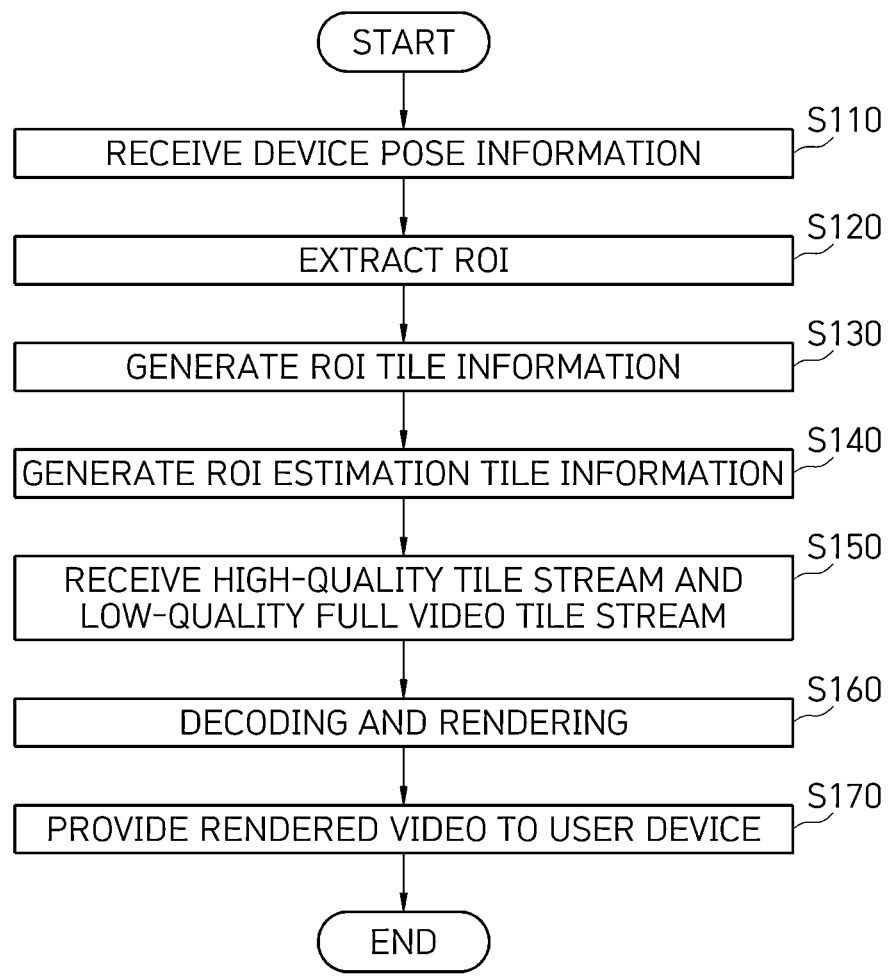
FIG. 3 is a flowchart of a low-latency 360 VR streaming method according to an embodiment of the present disclosure.

FIG. 3 is a flowchart of a low-latency 360 VR streaming method according to an embodiment of the present disclosure.

The low-latency 360 VR streaming method according to an embodiment of the present disclosure includes a step S110 of first receiving device pose information from a user device, a step S120 of extracting an ROI of the user, based on the device pose information, a step S130 of generating ROI tile information corresponding to the ROI, a step S140 of generating ROI estimation tile information corresponding to a position at which the ROI is to be changed, a step S150 of requesting, from a streaming server, a tile corresponding to the ROI tile information and the ROI estimation tile information to receive a low-quality tile stream (hereinafter referred to as a low-quality full video tile stream) of full video, a step S160 of decoding and rendering the high-quality tile stream and the low-quality full video tile stream, and a step S170 of providing the rendered video to a user device.

Furthermore, each of the steps illustrated in FIG. 3 may be understood as being performed by the low-latency 360 VR streaming system described above, but is not limited thereto.

First, the low-latency 360 VR streaming system receives the device pose information from the user device 200 in step S110. Here, the user device 200 may be an HMD device for reproducing 360 VR content.

Subsequently, the low-latency 360 VR streaming system extracts the ROI of the user on the basis of the device pose information in step S120, generates the ROI tile information corresponding to the ROI in step S130, and generates the ROI estimation tile information corresponding to the position at which the ROI is to be changed in step S140.

Figure 4:
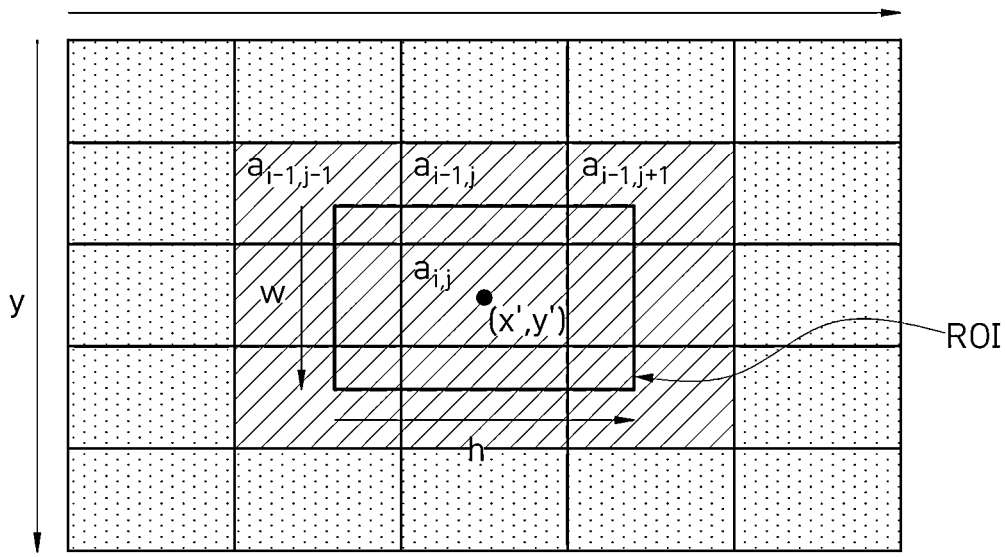
FIG. 4 is a diagram for describing a process of generating ROI tile information and ROI estimation tile information.

FIG. 4 is a diagram for describing a process of generating ROI tile information and ROI estimation tile information.

In 360 VR tiled video streaming, estimating an ROI of a user is to predict a tile adjacent to a tile which is currently being streamed. Accordingly, when the ROI of the user is changed, a probability that a tile corresponding to the ROI of the user is changed increases progressively toward a boundary of the currently streamed tile and increases as an ROI change direction of the user is toward the boundary of the tile.

Therefore, when an ROI of a user is changed, an embodiment of the present disclosure may predict a tile corresponding to a subsequent ROI of the user by using ROI information and the amount of change thereof and may previously cache a tile adjacent to an ROI tile which is currently being reproduced, thereby minimizing a switching latency of streaming.

To estimate an ROI of a user, first, an embodiment of the present disclosure selects ROI tiles corresponding to a real ROI, based on current device pose information, and selects an ROI estimation tile adjacent to a tile corresponding to the real ROI, based on the amount of change with previous ROI information.

In a case where videos of peripheral tiles corresponding to a ROI of a user in 360 VR tiled video are mapped to some virtual two-dimensional (2D) textures and are expressed as in FIG. 4, center tile information ($a_{i,j}$) corresponding to a center of an extracted ROI may be represented as in the following Equation 1.

$$\text{center of tiles } a_{i,j} \begin{cases} i = \begin{cases} 1 & \text{if } (x' = 0) \\ \left\lceil \frac{n \times x'}{x} \right\rceil & \text{if } (0 < x' \leq x) \end{cases} \\ j = \begin{cases} 1 & \text{if } (y' = 0) \\ \left\lceil \frac{m \times y'}{y} \right\rceil & \text{if } (0 < y' \leq y) \end{cases} \end{cases} \quad \text{[EQUATION 1]}$$

Here, in Equation 1, x, y and x', y' respectively denote a center pixel coordinate value of an ROI and a full resolution of video, and m, n denote the number of horizontal tiles and vertical tiles of tiled video.

When the center tile information ($a_{i,j}$) is calculated, tile group information group($a_{i,j}$) corresponding to an ROI is calculated through Equation 2 subsequently, based on the center tile information ($a_{i,j}$).

$$\text{group } (a_{i,j}) = [a_{k,l}]_{i-1 \leq k \leq i+1, j-1 \leq l \leq j+1} \quad \text{[EQUATION 2]}$$

In this case, in the tile group information corresponding to an ROI, a desired amount of information about an adjacent tile may be calculated by using size information about a tile and a resolution of the ROI, and a tile corresponding to a desired amount of information about the adjacent tile may be calculated as the tile group information.

Subsequently, in a process of estimating the ROI of the user, an ROI estimation tile is selected based on an ROI position and a boundary of a currently disposed ROI.

First, in order to calculate an ROI position of a user, edge position information (median_width and median_height) about the ROI is calculated based on the tile group information. Also, when the amount of change in the ROI is greater than or equal to a certain distance d per frame with respect to the edge position information, tiles adjacent to the ROI tile information is generated as ROI estimation tile information. Such high-quality ROI estimation tile information may be defined as Top($a_{i,j}$), Bottom($a_{i,j}$), Left($a_{i,j}$), and Right($a_{i,j}$) and may be calculated through Equation 3.

$$\text{Top}(a_{i,j}) = \quad \text{[EQUATION 3]}$$
$$\begin{cases} [a_{i-2,k}]_{j-1 \leq k \leq j+1} & \text{if } \left(\text{median\_width}(a_{i-1,j}) > y' - \frac{w}{2} \text{ and } \Delta y' > d\right) \\ \emptyset & \text{otherwise} \end{cases}$$

$$\text{Bottom}(a_{i,j}) =$$
$$\begin{cases} [a_{i-2,k}]_{j-1 \leq k \leq j+1} & \text{if } \left(\text{median}_{width(a_{i+1,j})} < y' + \frac{w}{2} \text{ and } \Delta y' < d\right) \\ \emptyset & \text{otherwise} \end{cases}$$

$$\text{Left}(a_{i,j}) =$$
$$\begin{cases} [a_{k,j-2}]_{i-1 \leq k \leq i+1} & \text{if } \left(\text{median\_height}(a_{i,j-1}) > x' - \frac{h}{2} \text{ and } \Delta x' > d\right) \\ \emptyset & \text{otherwise} \end{cases}$$

$$\text{Right}(a_{i,j}) =$$
$$\begin{cases} [a_{k,j+2}]_{i-1 \leq k \leq i+1} & \text{if } \left(\text{median\_height}(a_{i,j+1}) < x' + \frac{h}{2} \text{ and } \Delta x' > d\right) \\ \emptyset & \text{otherwise} \end{cases}$$

In this case, median_width and median_height which are the edge position information denote a center value of a tile at a width or height edge among high-quality ROI tiles, and Δx, y represents the amount of change in the ROI with respect to an x axis or a y axis.

For example, in Top($a_{i,j}$), a top (a red box top of FIG. 4) of a current ROI of the user device 200 may be disposed more upward than a y-axis center value of tiles disposed at a top of a high-quality ROI tile, and when the amount of change of Δy is greater than or equal to a certain amount d, tiles adjacent to the top of the high-quality ROI tile may be selected as an ROI estimation tile.

Finally, tiled video tiles requested from the streaming server 300 are estimated tiles E($a_{i,j}$) of a tile corresponding to ROI tile information group($a_{i,j}$) and ROI estimation tile information Top($a_{i,j}$), Bottom($a_{i,j}$), Left($a_{i,j}$), and Right($a_{i,j}$).

$$\text{Estimated Tiles } E(a_{i,j}) = \quad \text{[EQUATION 4]}$$
$$\text{Group}(a_{i,j}) \cup \text{Top}(a_{i,j}) \cup \text{Bottom}(a_{i,j}) \cup \text{Left}(a_{i,j}) \cup \text{Right}(a_{i,j})$$

Referring again to FIG. 3, the low-latency 360 VR streaming system 100 may request, from the streaming server 300, a tile corresponding to the ROI tile information and the ROI estimation tile information to receive a high-quality tile stream and a low-quality full video tile stream.

In this case, an embodiment of the present disclosure is characterized by receiving the high-quality tile stream and the low-quality full video tile stream of a common media application format (CMAF) chunk unit.

Figure 5:
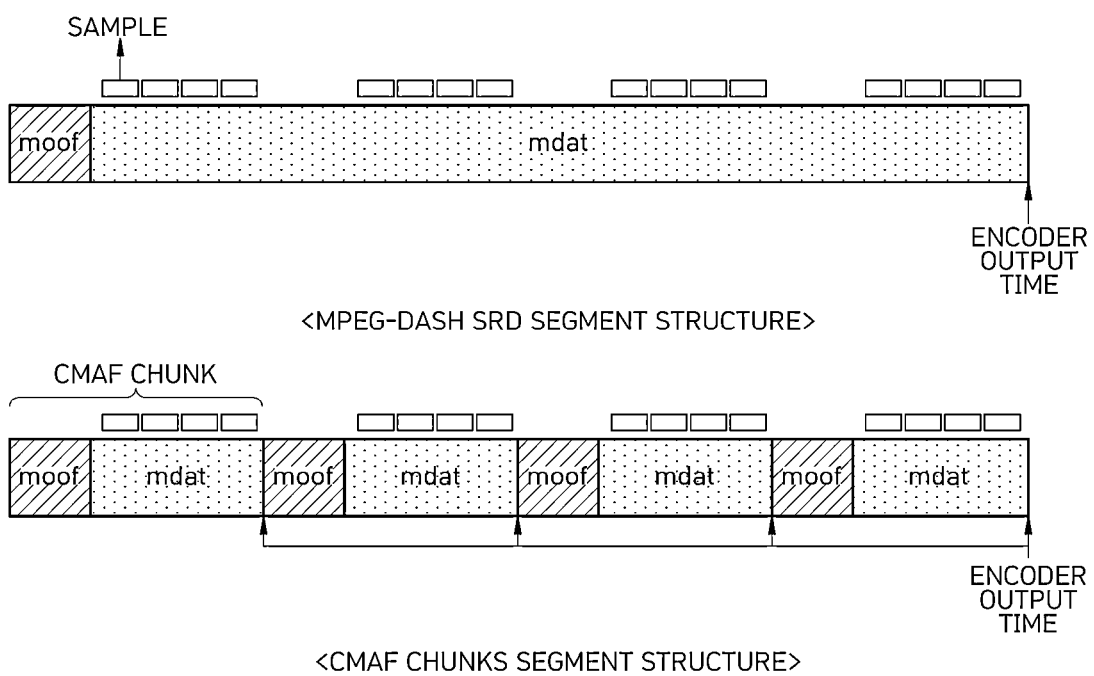
FIG. 5 is a diagram for describing conventional MPEG-DASH SRD protocol and CMAF protocol.

FIG. 5 is a diagram for describing conventional MPEG-DASH SRD protocol and CMAF protocol.

A segment structure of the MPEG-DASH SRD protocol has 'moof' header and 'mdat' data in one segment, and the 'mdat' data has several video samples.

A segment structure based on CMAF chuck may have several 'moof' headers and 'mdat' data in one segment and may thus have far fewer video samples than an MPEG-DASH SRD protocol-based segment.

Therefore, the MPEG-DASH SRD protocol may start decoding and rendering only when a streaming system receives all segments having a length of hundreds ms to several s. Because this is a trade-off state where a transmission time largely occurs as a unit of a segment increases and media presentation description (MPD) and packet overhead needed for a tile request increase even when a unit of a segment is reduced, it is difficult to expect the enhancement of a streaming latency through adjustment of a segment unit.

On the other hand, CMAF chunk-based protocol may start decoding and rendering from a time at which the reception of first CMAF chunk having a length of several ms to tens ms is completed in a process where the streaming system 100 receives a segment, and thus, there is an advantage where a streaming latency is considerably reduced.

Figure 6:
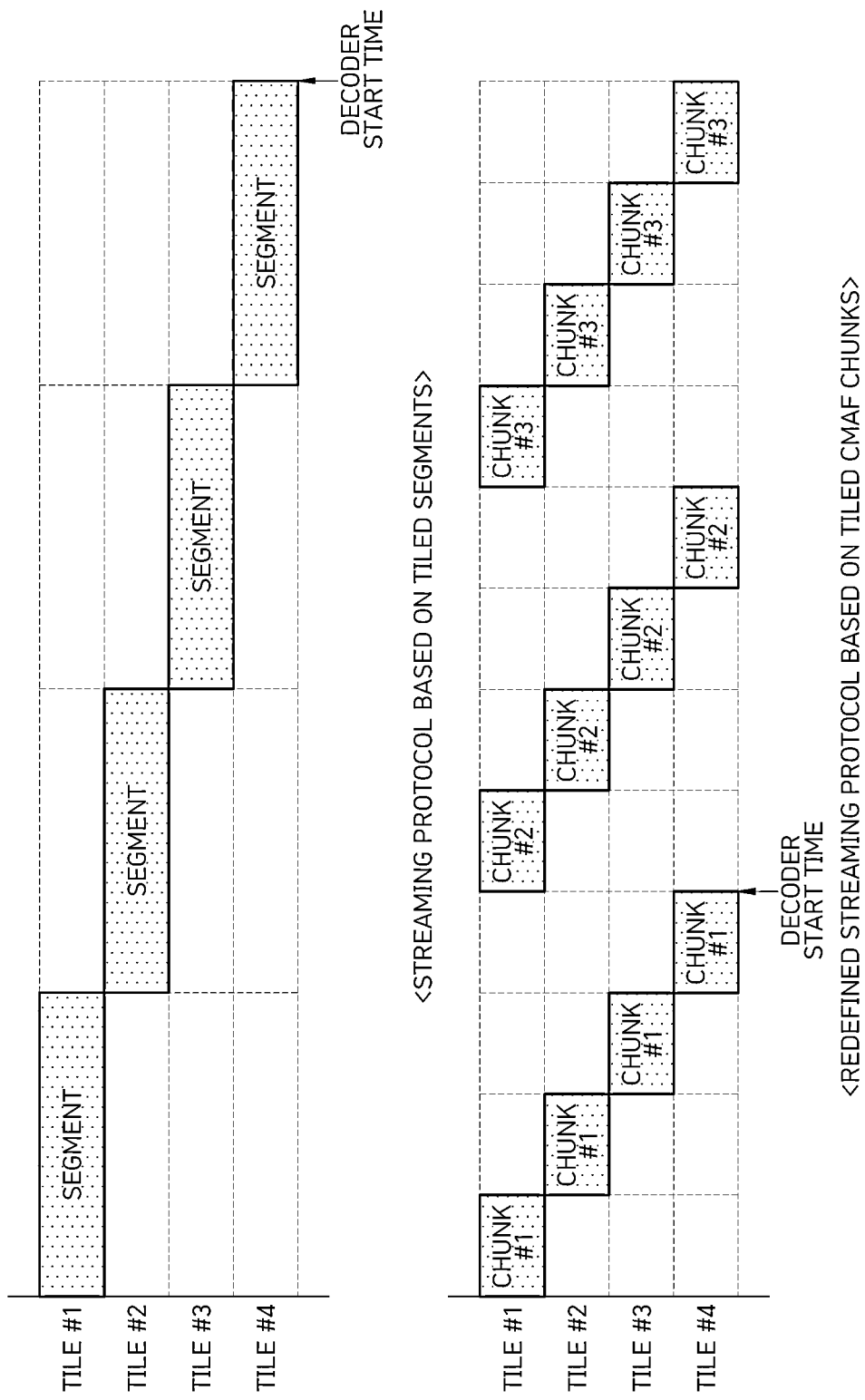
FIG. 6 is a diagram for describing tiled CMAF chunk protocol applied to an embodiment of the present disclosure.

FIG. 6 is a diagram for describing tiled CMAF chunk protocol applied to an embodiment of the present disclosure.

In a video streaming method based on tiled CMAF chunk protocol applied to an embodiment of the present disclosure, CMAF chunk may be completed at a time at which encoding is completed, and thus, when the low-latency 360 VR streaming system 100 receives first CMAF chunk for each tile, the low-latency 360 VR streaming system 100 may immediately start decoding. Accordingly, a streaming latency of video is minimized to a time at which first CMAF chunk for each tile is all transmitted.

To this end, an embodiment of the present disclosure allocates an index to each of a plurality of CMAF chunks corresponding to each tile and receives the CMAF chunks in the order of indexes of CMAF chunks alternately for each tile. That is, in the CMAF chunk protocol, decoding is possible when first CMAF chunk is received, it is important for the streaming server 300 to transmit first CMAF chunk for each tile so as to maximize efficiency. Therefore, as illustrated in FIG. 6(*b*), the streaming server 300 transmits or receives an index of CMAF chunk alternately for each tile.

Figure 7:
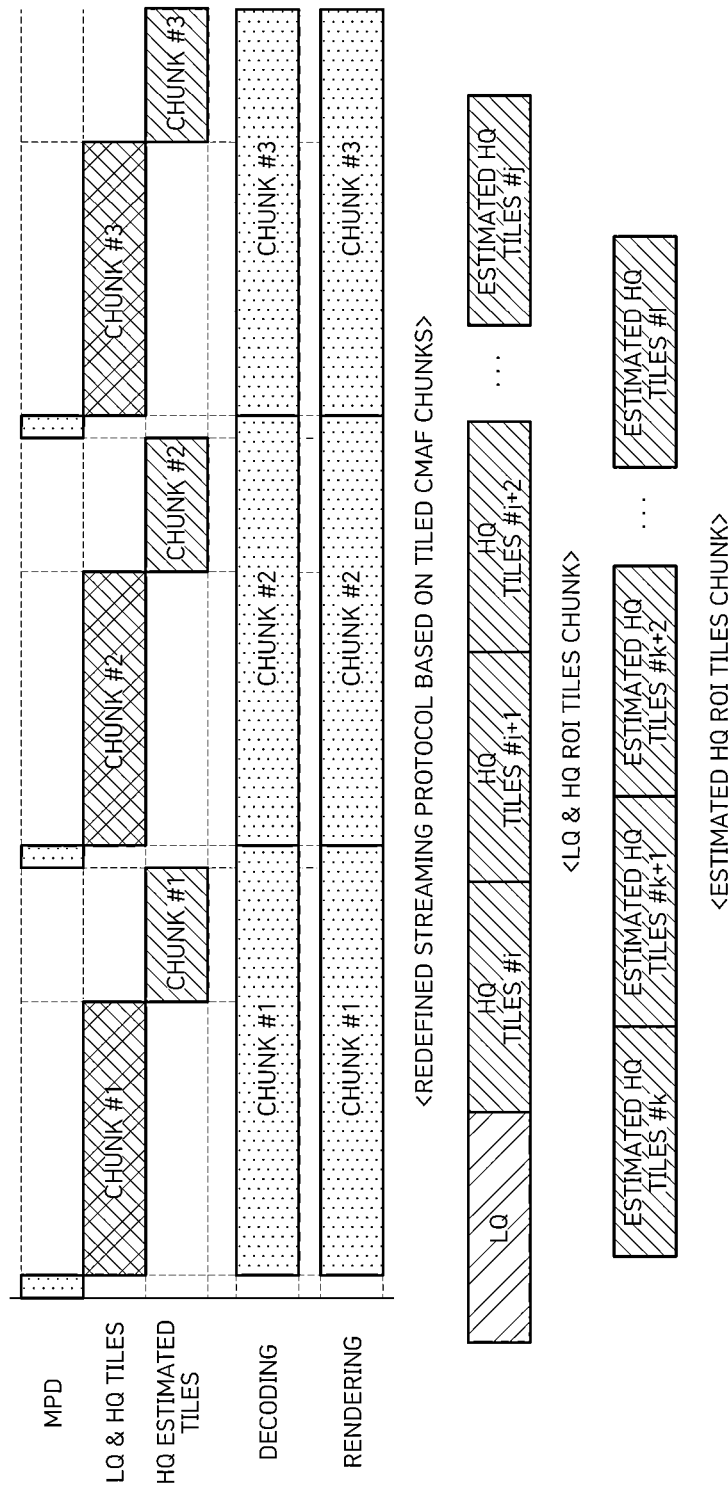
FIG. 7 is a diagram illustrating in more detail tiled CMAF chunk protocol applied to an embodiment of the present disclosure.

FIG. 7 is a diagram illustrating in more detail tiled CMAF chunk protocol applied to an embodiment of the present disclosure.

FIG. 7 is for describing an embodiment which applies tiled CMAF chunk protocol in an environment where there are an ROI high-quality tile stream, an ROI estimation high-quality tile stream, and a low-quality full video tile stream proposed in the present disclosure, and a priority may be set in each tile stream and each tile stream may be transmitted or received.

That is, the low-quality full video tile stream and the ROI high-quality tile stream are video which is streamed to a user in real time, and thus, are preferentially transmitted. Particularly, the low-quality full video tile stream is preferentially transmitted for seamless streaming to the user, and then, the ROI high-quality tile stream is transmitted.

When the transmission or reception of the low-quality full video tile stream and the ROI high-quality tile stream is completed, the ROI estimation high-quality tile stream is transmitted subsequently. That is, the ROI estimation high-quality tile stream is transmitted for the purpose of caching ready for changing of an ROI of a user, and thus, is transmitted in a lowest priority. Also, due to an issue such as network traffic, the transmission of the ROI estimation high-quality tile stream may stop in a case which exceeds timestamp.

Referring again to FIG. 3, subsequently, the low-latency 360 VR streaming system 100 decodes and renders the high-quality tile stream and the low-quality full video tile stream in step S160 and provides the rendered video to the user device 200 in step S170.

Figure 8:
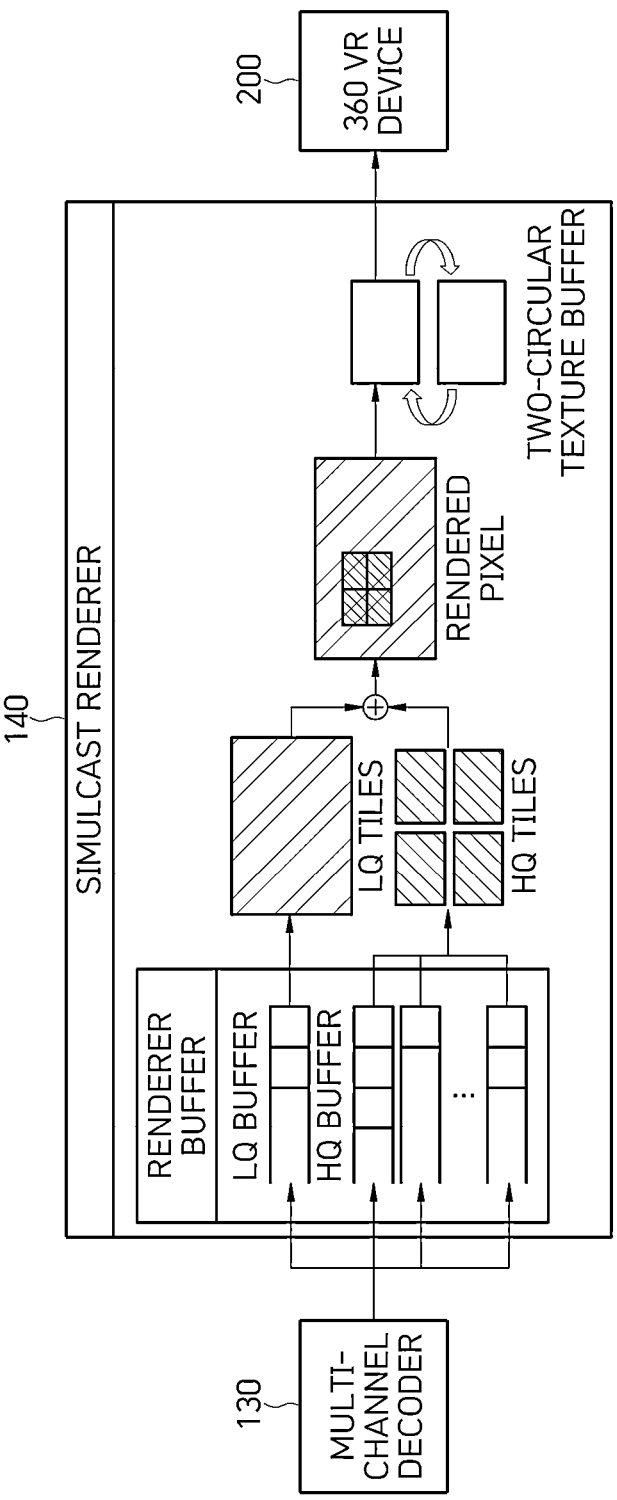
FIG. 8 is a diagram for describing a simulcast renderer in an embodiment of the present disclosure.
Figure 9:
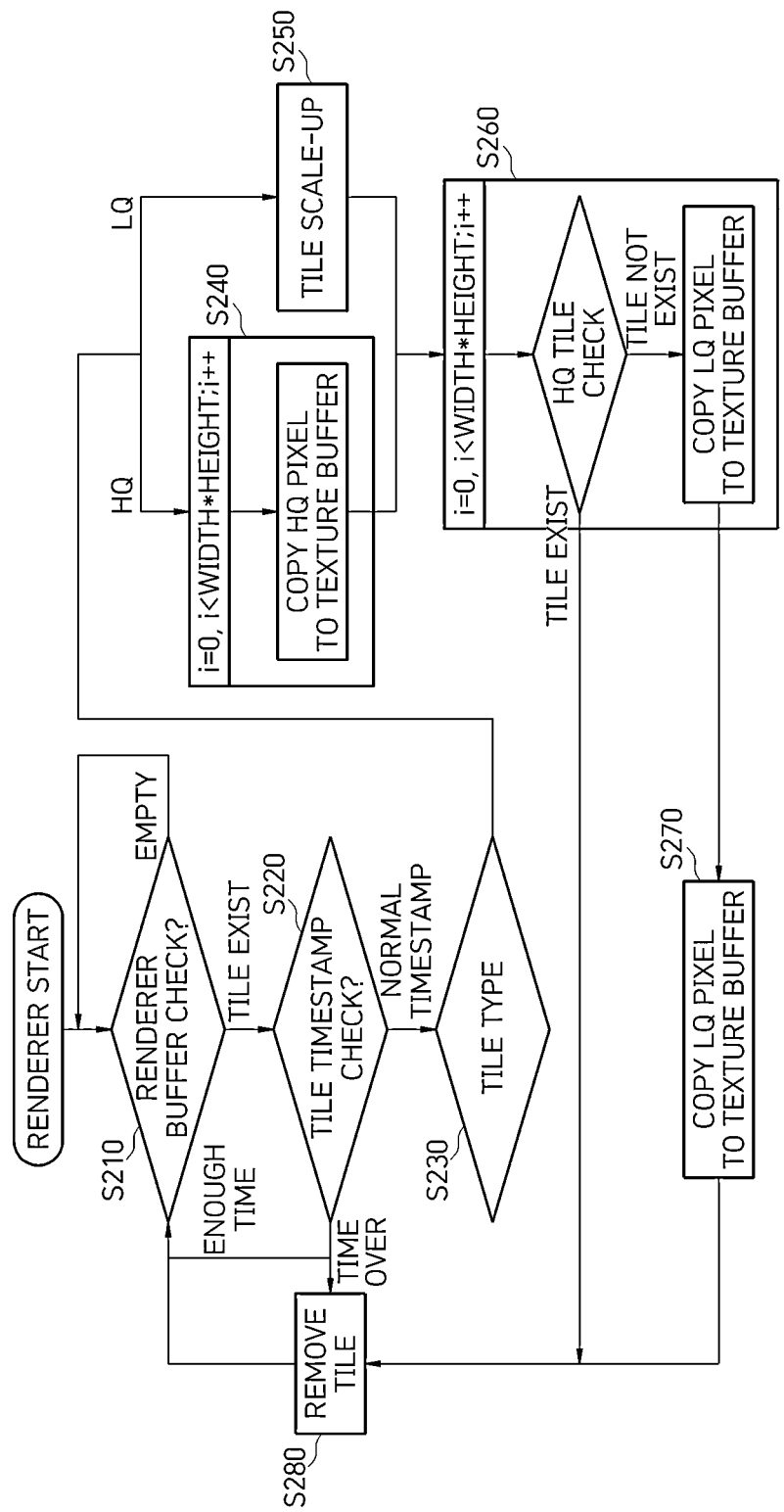
FIG. 9 is a flowchart for describing a simulcast rendering process in an embodiment of the present disclosure.

FIG. 8 is a diagram for describing a simulcast renderer in an embodiment of the present disclosure. FIG. 9 is a flowchart for describing a simulcast rendering process in an embodiment of the present disclosure.

In conventional streaming based on high-quality and low-quality tile video, when an ROI of a user is changed, because high-quality tile video of a changed ROI is re-requested from the streaming server 300, frame loss occurs while video is being decoded and rendered.

To solve such a problem, an embodiment of the present disclosure may simultaneously render a low-quality full video tile stream and a high-quality tile stream, which are low in bandwidth needed for transmission and may thus prevent the frame loss.

Referring to FIG. 8, a multi-channel decoder decodes a low-quality full video tile stream and a high-quality tile stream.

Moreover, a simulcast renderer first renders decoded high-quality tile video and renders a low-quality full video tile stream in a region which is not rendered.

At this time, the simulcast renderer ma load a texture used in rendering by using a two-circular texture buffer and may thus reduce a streaming latency.

Referring to FIG. 9, the simulcast renderer 140 has a separate renderer buffer and thread for each tile of a segmented high-quality tile stream in full resolution and a low-quality full video tile stream.

A renderer thread checks a renderer buffer at a period which is certain timestamp in steps S210 and S220, checks whether there is a decoded video frame, and renders or removes a decoded tile stream, based on timestamp.

First, a renderer buffer of a high-quality tile stream is checked in step S230, and then, mapping is performed on a texture region corresponding to a tile in step S240. When mapping on the high-quality tile stream is completed, the low-quality full video tile stream is scaled up by a size of a texture in a renderer buffer corresponding to the low-quality full video tile stream in step S250, and the low-quality full video tile stream is additionally mapped to a texture region which is a non-rendering region in step S260. When a mapping operation is all completed, a memory is removed, and a new frame is again rendered by replacing a texture buffer in steps S270 and S280.

Streaming through simulcast rendering applied to an embodiment of the present disclosure has the following advantages.

First, because high-quality tile video is rendered in a low-quality full video tile stream, when an ROI of a user is changed or high-quality tile video is disconnected due to a specific issue, this is replaced by low-quality video, and thus, streaming is possible without a disconnection and a latency of video.

Second, this is a rendering method which is very effective for caching through an ROI estimation algorithm. In a case where caching through the ROI estimation algorithm is applied, when an ROI of a user is changed, the streaming system 100 may load high-quality tile video in a cache to immediately perform streaming. In this case, a switching latency is consumed by a decoding time.

Finally, because simulcast rendering does not overall render high-quality tile video, even when a portion of the high-quality tile video, rendering is possible with only normal tile video. Because this does not need a separate rendering standby time for each tile in a process where CMAF chunks of a high-quality video tile are sequentially transmitted in transmission protocol of a CMAF chunk unit, there is an advantage where immediate streaming is possible without a streaming latency.

Furthermore, in the above description, steps S110 to steps S280 may be more divided into additional steps, or may be combined as fewer steps, based on an implementation example of the present disclosure. Also, some steps may be omitted depending on the case, or the order of steps may be changed. Also, despite other omitted details, details described above with reference to FIGS. 3 to 9 are applied to the low-latency 360 VR streaming system of FIG. 2.

The low-latency 360 VR streaming method for estimating an ROI of a user according to an embodiment of the present disclosure described above may be implemented as a program (or an application) and may be stored in a medium, so as to be executed in connection with a server which is hardware.

The above-described program may include a code encoded as a computer language such as C, C++, JAVA, or machine language readable by a processor (CPU) of a computer through a device interface of the computer, so that the computer reads the program and executes the methods implemented as the program. Such a code may include a functional code associated with a function defining functions needed for executing the methods, and moreover, may include an execution procedure-related control code needed for executing the functions by using the processor of the computer on the basis of a predetermined procedure. Also, the code may further include additional information, needed for executing the functions by using the processor of the computer, or a memory reference-related code corresponding to a location (an address) of an internal or external memory of the computer, which is to be referred to by a media. Also, when the processor needs communication with a remote computer or server so as to execute the functions, the code may further include a communication-related code corresponding to a communication scheme needed for communication with the remote computer or server and information or a media to be transmitted or received in performing communication, by using a communication module of the computer.

The stored medium may denote a device-readable medium semi-permanently storing data, instead of a medium storing data for a short moment like a register, a cache, and a memory. In detail, examples of the stored medium may include read only memory (ROM), random access memory (RAM), CD-ROM, a magnetic tape, floppy disk, and an optical data storage device, but are not limited thereto. That is, the program may be stored in various recording mediums of various servers accessible by the computer or various recording mediums of the computer of a user. Also, the medium may be distributed to computer systems connected to one another over a network and may store a code readable by a computer in a distributed scheme.

Operations of an algorithm or a method described above according to the embodiments of the present disclosure may be directly implemented as hardware, implemented as a software module executed by hardware, or implemented by a combination thereof. The software module may be provided in RAM, ROM, erasable programmable read only memory (EPROM), electrical erasable programmable read only memory (EEPROM), flash memory, a hard disk, an attachable/detachable disk, and CD-ROM, or a computer-readable recording medium of an arbitrary type well known to those skilled in the art.

Hereinabove, the embodiments of the present disclosure have been described above with reference to the accompanying drawings, but it may be understood that those skilled in the art may implement the present disclosure as another detailed type without changing the technical scope or essential feature of the present disclosure. Accordingly, it should be understood that the embodiments described above are exemplary in all aspects and are not limited.

What is claimed is:

1. A low-latency 360 virtual reality (VR) streaming method for estimating a region of interest (ROI) of a user, the low-latency 360 VR streaming method comprising:
   receiving device pose information from a 360 VR device that comprises a user device;
   extracting an ROI of a user, based on the device pose information;
   generating ROI tile information corresponding to the ROI;
   generating ROI estimation tile information corresponding to a position at which the ROI is to be changed;
   requesting, from a streaming server, a tile corresponding to the ROI tile information and the ROI estimation tile information to receive a high-quality tile stream and a low-quality tile stream of full video that comprises a low-quality full video tile stream;
   decoding and rendering the high-quality tile stream and the low-quality full video tile stream; and
   providing the rendered video to the user device.

2. The low-latency 360 VR streaming method of claim 1, wherein generating the ROI tile information comprises:
   calculating center tile information corresponding to a center of the extracted ROI; and
   calculating tile group information corresponding to the ROI, based on the center tile information.

3. The low-latency 360 VR streaming method of claim 2, wherein calculating the tile group information corresponding to the ROI based on the center tile information comprises:
   calculating desired amount information about an adjacent tile by using size information about a tile and a resolution of the ROI; and
   calculating a tile, corresponding to the desired amount information about the adjacent tile, as tile group information.

4. The low-latency 360 VR streaming method of claim 3, wherein generating the ROI estimation tile information comprises:
   calculating edge position information about the ROI, based on the tile group information; and
   generating tiles adjacent to the ROI tile information as ROI estimation tile information when an amount of change in the ROI is greater than or equal to a certain distance per frame with respect to the edge position information.

5. The low-latency 360 VR streaming method of claim 1, wherein receiving the high-quality tile stream and the low-quality full video tile stream receives the high-quality tile stream and the low-quality full video tile stream of a common media application format (CMAF) chunk unit.

6. The low-latency 360 VR streaming method of claim 5, wherein receiving the high-quality tile stream and the low-quality full video tile stream allocates an index to each of a plurality of CMAF chunks corresponding to each tile and receives the CMAF chunks in the order of indexes of CMAF chunks alternately for each tile.

7. The low-latency 360 VR streaming method of claim 5, wherein receiving the high-quality tile stream and the low-quality full video tile stream comprises:
   receiving a low-quality full video tile stream from the streaming server;

receiving a high-quality tile stream that comprises an ROI high-quality tile stream corresponding to the ROI tile information; and receiving a high-quality tile stream that comprises an ROI estimation high-quality tile stream corresponding to the ROI estimation tile information as the reception of the low-quality full video tile stream and the ROI high-quality tile stream is completed.

8. The low-latency 360 VR streaming method of claim 1, wherein decoding and rendering the high-quality tile stream and the low-quality full video tile stream comprises:

rendering the decoded high-quality tile stream; and rendering the low-quality full video tile stream in a non-rendering region as the rendering of the decoded high-quality tile stream is completed.

9. The low-latency 360 VR streaming method of claim 8, wherein decoding and rendering the high-quality tile stream and the low-quality full video tile stream loads a texture used in the rendering by using a two-circular texture buffer.

10. The low-latency 360 VR streaming method of claim 8, wherein rendering of the decoded high-quality tile stream checks a renderer buffer corresponding to the high-quality tile stream to perform mapping on a texture region corresponding to a tile, and wherein rendering the low-quality full video tile stream in the non-rendering region scales up the low-quality full video tile stream by a size of a texture in a renderer buffer corresponding to the low-quality full video tile stream and additionally maps the low-quality full video tile stream to a texture region which is the non-rendering region.

11. A low-latency 360 virtual reality (VR) streaming system for estimating a region of interest (ROI) of a user, the low-latency 360 VR streaming system comprising:

a pose information tracking configured to receive device pose information from a 360 VR device that comprises a user device;

a stream reception processor configured to:

extract an ROI of a user, based on the device pose information, generate ROI tile information corresponding to the ROI and ROI estimation tile information corresponding to a position at which the ROI is to be changed, and request, from a streaming server, a tile corresponding to the ROI tile information and the ROI estimation tile information to receive a high-quality tile stream and a low-quality tile stream of full video that comprises a low-quality full video tile stream;

a multi-channel decoder configured to decode the high-quality tile stream and the low-quality full video tile stream; and a simulcast rendering processor configured to perform rendering based on the decoded high-quality tile stream and the decoded low-quality full video tile stream to provide rendered video to the user device.

* * * * *